Aug. 3, 1965  L. LO BELLO  3,198,397

WATER CARRIER FOR FARM TRACTOR

Filed Oct. 1, 1963

INVENTOR.
LEON E. LoBELLO
BY John R. Walker, III
ATTORNEY

United States Patent Office 3,198,397
Patented Aug. 3, 1965

3,198,397
WATER CARRIER FOR FARM TRACTOR
Leon Lo Bello, 4479 E. Dearing Road, Memphis, Tenn.
Filed Oct. 1, 1963, Ser. No. 313,084
15 Claims. (Cl. 222—176)

This invention relates generally to water carriers and particularly to drinking water containers which are used by workers or tractor operators while working in the field. Specifically, the present invention is a cold water carrying container adapted to be removably secured to and transported on the hood of a farm tractor or industrial tractor.

Heretofore, when a farmer or tractor operator was working in the field, it was the usual practice for him to carry along a jug or container of water and to place it on the ground, usually at the place where he began work. In certain farm work, and particularly in such tractor-powered work as plowing, seeding and cultivating, it often occurred that during the working of the field the tractor and operator would travel a considerable distance from the placed jug or container of water. Hence, when the operator wanted a drink of water, he must either have driven the tractor back or walked back to where the water container was placed. As it was usually impractical to drive an implement-loaded tractor back to the water container, the operator usually walked to get water. It is apparent that this was very inconvenient and resulted in much time lost from the work being done, and particularly was time consuming when several tractor operators or workmen were in a field together and drank from the same container of water.

It is, therefore, an object of the present invention to provide a water carrier positioned on a tractor so as to provide cool water within easy reach of the operator of the tractor, and also to conveniently provide cool water for other tractor operators or workmen as may be working in the same field.

A further object is to provide a water carrier of novel shape so that the water contained therein will drain fully and be available for drinking although the tractor and the container are in a slanted position.

A further object is to provide an insulated water carrier of sufficient capacity to furnish water for several workmen and also of such large capacity as to insure that the water contained therein will be kept cool and fresh for a longer time than is possible in smaller and less efficient containers.

A further object is to provide a water carrier that will fit practically all makes and models of farm tractors.

The means by which the foregoing and other objects of the present invention are accomplished and the manner of their accomplishment will be readily understood from the following specification upon reference to the accompanying drawings, in which.

Figure 2:
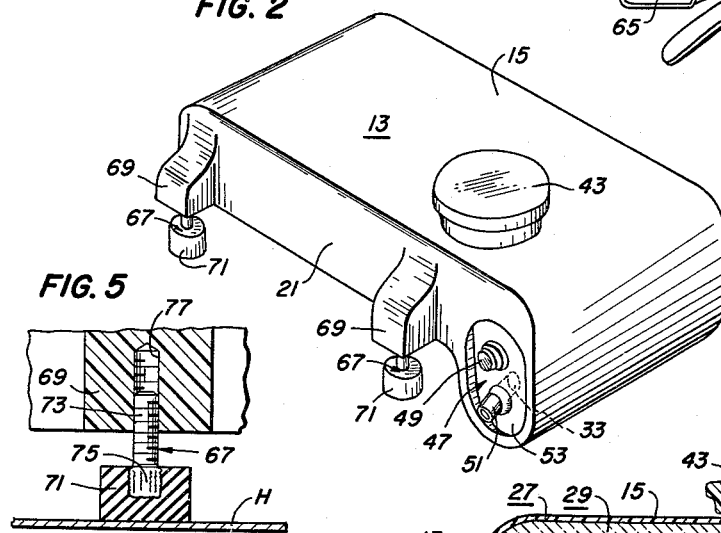
FIG. 2 is a perspective view of the water carrier.
Figure 4:
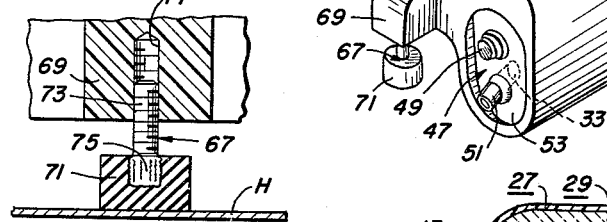
FIG. 4 is a transverse sectional view taken as on the line IV—IV of FIG. 1.

Referring now to the drawings in which the various parts are indicated by numerals, the water carrier indicated as at 11 comprises a walled container 13 preferably having top, bottom, front, back and side walls 15, 17, 19, 21, 23, 25, respectively. Container 13 is preferably constructed of plastic material having an outer layer 27 and an inner layer 29, as seen in FIG. 4. Outer layer 27 is of substantially dense and rigid plastic and serves to strengthen and fixedly support the walls of the container. Inner layer 29 is of open-cell or foam-type plastic and serves substantially to thermally insulate the water W. Container 13 is preferably rectangular and is adapted to be transversely mounted over the hood H of the tractor. Container 13 is hollow and includes an inlet opening 31 in top wall 15 and an outlet opening 33 in back wall 21, as seen in FIGS. 4 and 2. Container 13 includes a horizontally extending main chamber part 35 disposed over hood H and a vertically extending secondary chamber part 37 disposed laterally of the hood, as best seen in FIG. 4. Bottom wall 17, in defining the above described shape of the container, thus includes a substantially flat first portion 39 and a second curved portion 41. The intersections of side walls 23, 25 with top wall 15 and also the second portion 41 of bottom wall 17 are preferably rounded to provide a neat appearing container.

Hand operable cover means is attached to top wall 15 to sealingly cover and uncover inlet opening 31. An internally threaded cap 43, co-actingly engaging an externally threaded flange 45 of top 15, preferably comprises the cover means of water carrier 11.

A hand operable valve 47 is attached to the lower portion of back wall 21 of container 13 for permitting and controlling the passage of water through outlet opening 33. Valve 47, although not shown in detail, is of the generally available spring-closed push-button type, and includes a button 49 and a spout 51. Valve 47 is preferably recessed in the outer surface of back wall 21 in recess 53, as seen in FIG. 2.

Figure 1:
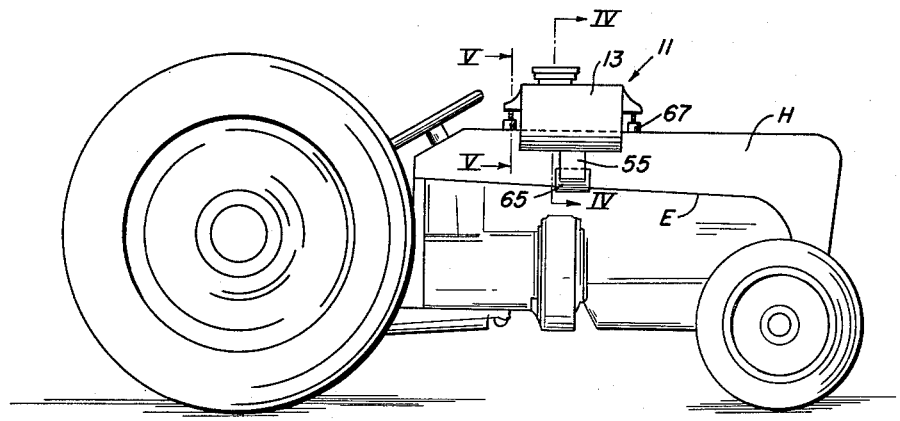
FIG. 1 is a side elevational view of the water carrier of the present invention shown mounted on a farm tractor.
Figure 3:
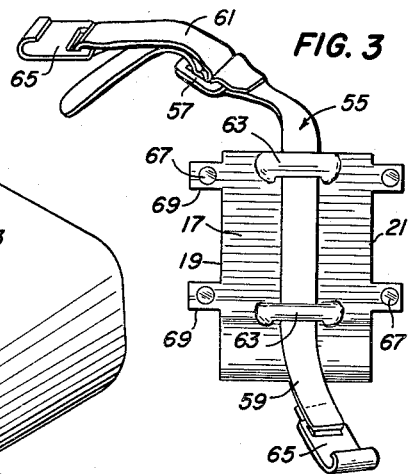
FIG. 3 is a bottom view illustrating the preferred securing means of the water carrier.
Figure 5:
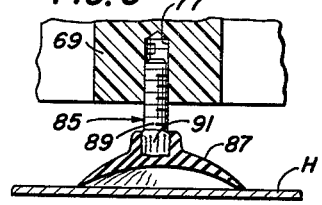
FIG. 5 is a fragmentary sectional view taken as on the line V—V of FIG. 1.

Securing means are provided for removably securing container 13 to hood H of the tractor. Securing means in the preferred form of the water carrier 11 is best seen in FIGS. 3 and 4 and is as follows: A two-piece flexible strap 55 is provided and is joined by an adjustment buckle 57. Strap 55 includes a fixed length piece 59 and an adjustable length piece 61. The fixed length piece 59 of strap 15 preferably extends around a pair of brackets 63 integrally formed with and attached to container 13 and pendantly disposed from bottom wall 17. A pair of hook-shaped end members 65 are provided, with each end member being attached to an end of flexible strap 55. Securing means in the preferred form of the water carrier 11 also includes forwardly and rearwardly disposed pairs of support legs 67 attached to projections 69 of container 13. Front and rear pairs of projections 69 are integrally formed with and extend outwardly from the respective front and back walls 19, 21. Each of support legs 67 preferably includes a rubber pad 71 and a threaded shank 73, as best seen in FIG. 5. Pad 71 is cylindrical and is preferably vulcanized to the lower fluted portion 75 of a respective shank 73. Threaded apertures 77 in projections 69 engage respectively the threaded portions of shanks 73. Support legs 67 adjustably extend subjacently from container 13 with the respective pads 71 thereof restingly engaging the upper surface of tractor hood H. Supported horizontally over the hood of the tractor by legs 67, the container is securely held thus by manually adjusting buckle 57 and tensioning flexible strap 55 and with the pair of hook-shaped end members 65 respectively engaging the lower edges E of the respective sides of the hood H, as seen in FIGS. 1 and 4.

A flanged drinking cup 81 is preferably removably housed in the inlet opening 31 of water carrier 11 and is covered by cap 43 when not in use; that is, when not in use and as seen in FIG. 4, drinking cup 81 is received in opening 31 with the flanged rim 83 thereof interposedly held between cap 43 and the flanged portion 45 of top wall 15.

It is desirable that container 13 be mounted horizontally level so that the water will drain fully when valve 47 is open. In certain farm work, however, particularly as when plowing, the tractor is often operated in a slanted or unlevel disposition. Therefore, prior to the manual tensioning of flexible strap 55, the support legs 67 should be adjustably positioned, and the container aligned horizontally. Another factor which should be considered in the mounting of the water carrier on the tractor is that it should be disposed somewhat above the hood of the tractor and with space between bottom wall 17 and the top surface of hood H, for as the tractor is operated, the hood often becomes fairly warm, and the space between the container and the hood permits air to circulate freely therebetween and thus aids in keeping water in the container cool.

A modification of the means securing the container 13 to tractor hood H may be desirable in some applications of the water carrier. Two modifications are thus provided, as shown respectively in FIGS. 6 and 7. Both modifications utilize the threaded apertures 77 of projections 69 but do not necessitate the use of support legs 67 or flexible strap 55.

Figure 6:
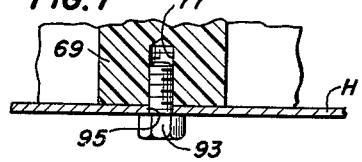
FIG. 6 is a view similar to FIG. 5 but illustrating the securing means of a modified form of the water carrier.

The first modification, as shown in FIG. 6, substitutes rubber vacuum cup members 85 for support legs 67. Each vacuum cup member 85 includes a vacuum cup 87 and a threaded shank 89. Vacuum cup 87 is of the usual kind and is preferably vulcanized to the fluted portion 91 of shank 89. In the attachment of the container 13 to tractor hood H, the vacuum cup members 85 engage under vacuum the upper surface of the hood and securely attach the container to the tractor.

Figure 7:
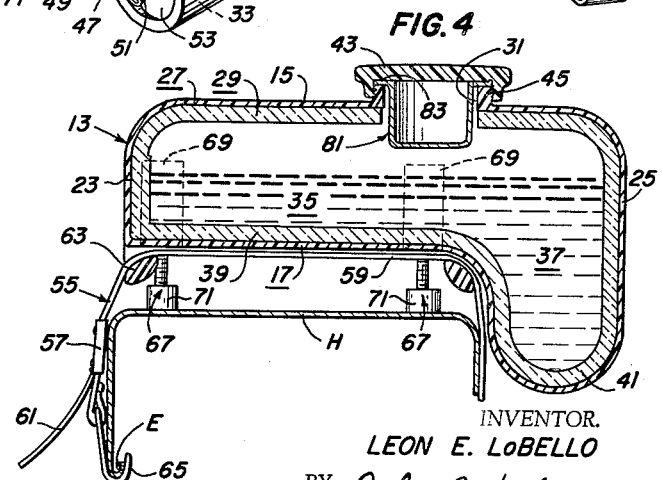
FIG. 7 is a view also similar to FIG. 5 and illustrating the securing means of another modification of the device of the present invention.

The second modification is shown in FIG. 7, wherein it will be seen bolts 93 extend through apertures 95 in the hood H of the tractor and threadedly engage apertures 77 of container 13.

From the foregoing it is apparent that by using the water carrier of the present invention, a convenient supply of cool drinking water may be provided for one or many tractor operators or farm workmen. Further, the water contained in the transportable water carrier of this invention is always close at hand, thus facilitating that such time as has heretofore been spent in going for water can now be used on the job. Moreover, water carrier 11 is of such novel shape as to permit the water to drain fully from the container and is also provided with such securing means as to be readily attached to and detached from all makes and models of tractors.

Although the invention has been described in some detail by way of illustration and example for purposes of clarity or understanding, it is to be understood that it is not to be so limited since changes and modifications may be made therein which are within the full intended scope of this invention as hereinafter claimed.

I claim:

1. In combination with a tractor having a hood covering the engine thereof, a water carrier comprising a container having insulated wall means defining a chamber for carrying water, means attached to said wall means and communicating with said chamber for dispensing the water therefrom, means removably securing said water container to said hood, means supporting said container in spaced relationship above said hood for permitting air to circulate between said container and said hood, and said means removably securing said water container to said hood including flexible strap means attached to said container and hook-shaped end members attached to the ends of said strap means and removably hooked under and engaging the lower edge portions of the respective sides of the tractor hood.

2. In combination with a tractor having a hood covering the engine, a water carrier adapted to insulatably hold and dispense water, said water carrier comprising a container of material having substantial thermal insulating properties; said container having a top wall, front and back wall members, and a bottom wall; said top wall being provided with an inlet opening and one of said wall members being provided with an outlet opening, a portion of said bottom wall being disposed over the hood of the tractor, hand operable cover means attached to said top wall for sealingly covering and uncovering said inlet opening, hand operable valve means attached to said container adjacent said bottom wall for controlling the passage of water through said outlet opening, and securing means removably securing said container to the hood of the tractor.

3. The combination of claim 2 which includes a drinking cup removably housed in said inlet opening of said container and adapted to be covered by said cover means when not in use.

4. The combination of claim 2 in which said securing means includes flexible strap means attached to said container, hook-shaped end members attached to the ends of said strap means and removably hooked under and engaging the lower edge portions of the respective sides of the tractor hood, and adjustable buckle means interposed in said strap means and adjustably tensioning said strap means and bindingly securing said container to the tractor hood.

5. The combination of claim 2 in which said securing means including a plurality of rubber vacuum cup members subjacently attached to said container and operably engaging under vacuum the upper surface of the tractor hood.

6. The combination of claim 2 in which said securing means including a plurality of screw fasteners threadedly securing said container to the tractor hood.

7. The combination of claim 4 which includes a plurality of adjustably extended threaded support legs subjacently attached to said bottom wall and restingly engaging the upper surface of the tractor hood, said plurality of support legs being operable for adjustably positioning said container horizontally.

8. The combination of claim 5 in which said plurality of rubber vacuum cup members each includes an adjustably extending shank operable for adjustably positioning said container horizontally.

9. In combination with a tractor having a hood covering the engine, a water carrier adapted to insulatably hold and dispense water, said water carrier comprising a container of material having substantial thermal insulating properties; said container having a top wall, front and back wall members, and a bottom wall; said top wall being provided with an inlet opening and one of said wall members being provided with an outlet opening, a first portion and a second portion of said bottom wall, said first portion being substantially flat and disposed over the hood of the tractor, said second portion being recessed and pendantly attached from said first portion and disposed laterally of the hood of the tractor, hand operable cover means attached to said top wall for sealingly covering and uncovering said inlet opening, hand operable valve means attached to said container adjacent said bottom wall for controlling the passage of water through said outlet opening, and securing means removably securing said container to the hood of the tractor.

10. The combination of claim 9 which includes a drinking cup removably housed in said inlet opening of said container and adapted to be covered by said cover means when not in use.

11. The combination of claim 9 in which said securing means includes flexible strap means attached to said container, hook-shaped end members attached to the ends of said strap means and removably hooked under and engaging the lower edge portions of the respective sides of the tractor hood, and adjustable buckle means interposed in said strap means and adjustably tensioning said strap means and bindingly securing said container to the tractor hood.

12. The combination of claim 9 in which said securing means includes a plurality of rubber vacuum cup members subjacently attached to said container and operably engaging under vacuum the upper surface of the tractor hood.

13. The combination of claim 9 in which said securing means includes a plurality of screw fasteners threadedly securing said container to the tractor hood.

14. The combination of claim 11 which includes a plurality of adjustably extending threaded support legs subjacently attached to said bottom wall and restingly engaging the upper surface of the tractor hood, said plurality of support legs being operable for adjustably positioning said container horizontally.

15. The combination of claim 12 in which said plurality of rubber vacuum cup members each include an adjustably extending shank operable for adjustably positioning said container horizontally.

References Cited by the Examiner

UNITED STATES PATENTS

| | | | |
|---|---|---|---|
| 1,039,098 | 9/12 | Coffin. | |
| 1,962,997 | 6/34 | Novotny | 222—131 X |
| 2,036,539 | 4/36 | Prosser | 222—181 X |
| 2,708,540 | 555 | Cook et al. | 222—181 X |

LOUIS J. DEMBO, *Primary Examiner.*

HADD S. LANE, *Examiner.*